United States Patent
Kawabe et al.

[11] Patent Number: 6,062,539
[45] Date of Patent: May 16, 2000

[54] VALVE GEAR AND COUPLING MECHANISM FOR COUPLING THE VALVE STEM OF THE VALVE AND THE DRIVING SHAFT OF ACTUATOR

[75] Inventors: Ryu Kawabe, Tama; Iwao Yokoyama, Edogawa-ku, both of Japan

[73] Assignee: Toko Valex Co., Ltd., Tokyo, Japan

[21] Appl. No.: 08/787,291

[22] Filed: Jan. 24, 1997

[30]  Foreign Application Priority Data

| Jan. 24, 1996 | [JP] | Japan | 8-029886 |
| Feb. 23, 1996 | [JP] | Japan | 8-061920 |

[51] Int. Cl.⁷ ................. F16K 1/48; F16K 1/22
[52] U.S. Cl. ............ 251/214; 251/291; 251/308
[58] Field of Search ................. 251/214, 291, 251/308, 309

[56]  References Cited

U.S. PATENT DOCUMENTS

| D. 96,939 | 9/1935 | Schlafman | 251/291 X |
| 2,350,958 | 6/1944 | Bryant. | |
| 3,011,754 | 12/1961 | Ander. | |
| 3,438,662 | 4/1969 | Cowal et al. | |
| 3,472,269 | 10/1969 | Scholle | 251/291 X |
| 3,971,402 | 7/1976 | Gallo | 251/309 X |
| 4,384,705 | 5/1983 | Kato | 251/214 |
| 4,444,220 | 4/1984 | Seger | 251/214 X |
| 4,790,342 | 12/1988 | Segal | 251/291 X |
| 4,806,809 | 2/1989 | Kubota et al. | |
| 5,052,430 | 10/1991 | Trautwein | 251/291 X |

FOREIGN PATENT DOCUMENTS

| 1 751 887 | 9/1957 | Germany. |
| 68 04 615 | 3/1969 | Germany. |
| 27 11 178 | 9/1978 | Germany. |
| 41 25 252 | 2/1992 | Germany. |

*Primary Examiner*—John Rivell
*Attorney, Agent, or Firm*—Weneroth, Lind & Ponack, L.L.P.

[57]  ABSTRACT

A valve gear comprises a valve 1 having a valve element and a valve stem, and an actuator having a driving shaft for operating the valve element of the valve. A connecting portion 7 is provided on either the valve or the actuator. A sleeve having a smooth inner surface is fixedly or rotatably fitted in a bore formed in the connecting portion 7 so as to slidably receive the valve stem and the driving shaft and slidably contact the inner smooth surface of the sleeve with outer surfaces of the valve stem and the driving shaft. The valve stem and the driving shaft inserted into the sleeve through the opposite ends, of the sleeve are provided at their end portions with respective coupling portions, so that the stem and the shaft are able to engage with each other only at the particular one point of relative rotation of the stem and the shaft.

22 Claims, 14 Drawing Sheets

FIG. 10A
FIG. 10B
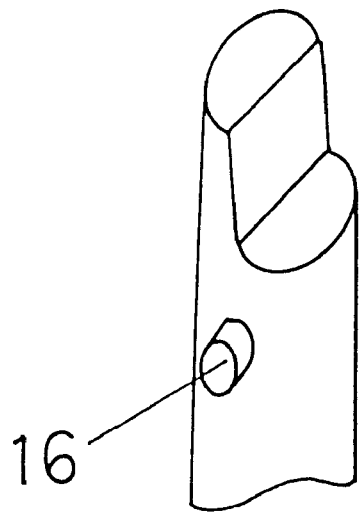
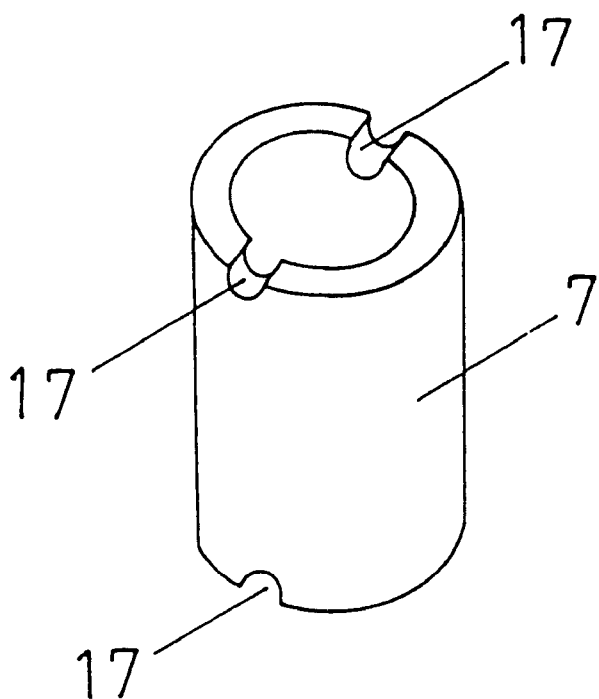
FIG. 11
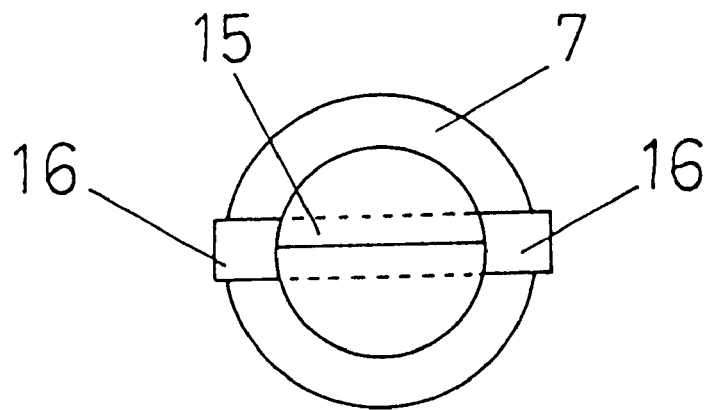

VALVE GEAR AND COUPLING MECHANISM FOR COUPLING THE VALVE STEM OF THE VALVE AND THE DRIVING SHAFT OF ACTUATOR

BACKGROUND OF THE INVENTION

1. Field of the Invention

The present invention relates to a valve gear to be placed in a piping system, and a coupling mechanism for coupling together the valve stem of the valve and the driving shaft of an actuator.

2. Description of the Related Art

Referring to FIG. 15, a conventional valve gear to be placed in a piping system comprises a valve 1 comprising a valve element 2 and a valve stem 3, and an actuator 4 having a driving shaft 5 for operating the valve element 2. When coupling the valve stem 3 of the valve 1 and the driving shaft 5 of the actuator 4 together, a bracket 10 is interposed between the valve 1 and the actuator 4, and the valve stem 3 and the driving shaft 5 of the actuator 4 are coupled together by a coupling device 20 as shown in FIG. 15, or the valve stem 3 and the driving shaft 5 of the actuator 4 are coupled together by engaging coupling parts formed in the respective free ends of the valve stem 3 and the driving shaft 5 of the actuator 4 without using any coupling device like the coupling device 20.

When coupling together the valve stem 3 and the driving shaft 5 by either of the foregoing methods, the respective axes of the valve stem 3 and the driving shaft 5 must be aligned. When aligning the valve stem 3 and the driving shaft 5 of the foregoing conventional valve gear, the bracket 10 disposed between the valve 1 and the actuator 4 is fastened lightly to the extremity of the valve 1 and the extremity of the body of the actuator 4 with bolts 21 so that the bracket 10 can be moved for positional adjustment, the respective axes of the valve stem 3 and the driving shaft 5 are aligned, and then the bracket 10 is fastened firmly to the valve 1 and the body of the actuator 4 with the bolts 21 as shown in FIG. 15.

When aligning the respective axes of the valve stem 3 and the driving shaft 5, the valve 1 and the actuator 4 are moved vertically, as viewed in FIG. 16, relative to each other for axial positional adjustment so that the upper coupling end of the valve stem 3 is inserted in the lower coupling groove of the driving shaft 5, and then adjusting bolts 22 and 23 are turned as shown in FIG. 17 for the horizontal positional adjustment of the valve stem 3 and the driving shaft 5 relative to each other. The valve stem 3 is shifted to the right, as viewed in FIG. 17, relative to the driving shaft 5 if the adjusting bolt 22 on the left side is screwed in, and the valve stem 3 is shifted to the left, as viewed in FIG. 17, relative to the driving shaft 5 if the adjusting bolt 23 on the right side is screwed in.

The vertical and the horizontal positions of the valve stem 3 and the driving shaft 5 are adjusted carefully with the bracket 10 lightly fastened to the extremity of the valve 1 and the extremity of the body of the actuator 4 with the bolts 21 to align the valve stem 3 and the driving shaft 5, as shown in FIG. 15, FIG. 16 and FIG. 17 and then the bracket 10 is fastened firmly to the valve 1 and the body of the actuator 4 with the bolts 21 after the valve stem 3 and the driving shaft 5 have been aligned.

Thus, the bracket 10 and the coupling device are indispensable to the conventional valve gear, the procurement and manufacture of those components require substantial costs, and the cost of the valve gear increases accordingly.

Furthermore, the operational of aligning the valve stem and the driving shaft of the actuator is complex, takes much time and requires skill.

Still further, the angular position of the valve stem and that of the driving shaft of the actuator must be matched so that the opening of the valve element is proportional to the angular movement of the driving shaft, which enhances the complexity of the aligning operation and requires further skill.

SUMMARY OF THE INVENTION

According to a first aspect of the present invention, a valve gear comprises a valve 1 having a valve element 2 and a valve stem 3, and an actuator 4 having a driving shaft 5 for operating the valve element 2 of the valve 1. A connecting portion is provided on either the valve 1 or the actuator 4. A sleeve 7 having a smooth inner surface is fixedly or rotatably fitted in a bore 6 formed in the connecting portion 7a of the valve 1 or the connecting portion of the valve operating actuator 4 so as to slidably receive the valve stem 3 and the driving shaft 5 and slidably contact the inner smooth surface of sleeve 7 with outer surfaces of the valve stem 3 and the driving shaft 5. The valve stem 3 and the driving shaft 5, inserted into the sleeve 7 through the respective opposite ends, of the sleeve 7 are provided at their end portions with coupling portions 8, 9, respectively.

In the before described, if the sleeve is supported for rotation in the bore of the connecting portion of the valve or the actuator, the sleeve may be loosely fitted in a bore formed in the connecting portion of the valve or the actuator, for example. In this case, when the valve stem and the driving shaft inserted into the sleeve through the opposite ends of the sleeve and coupled together by the engagement of the coupling portions thereof are rotated, the sleeve is rotated accordingly. Also, in this case, a connecting member may be interposed between the valve stem and the driving shaft, and the sleeve, the corresponding outer surface of the sleeve and the inner surface of the bore may be finished to be highly smooth surfaces or a sliding member may be interposed between the inner surface of the bore and the outer surface of the sleeve in order to rotate the sleeve smoothly.

However the sleeve may be supported for rotation in the bore, it may be altered to fix the sleeve to the bore, and if the sleeve is fixed to the bore of the connecting portion of the valve or the actuator, operability may be improved.

In is possible that an attachment 24 may be connected to the extremity of the connecting portion of the valve 1 or the extremity of the connecting portion of the actuator 4, and the sleeve 7 is fixed to or rotatably supported on the attachment 24.

According to a second aspect of the present invention, a coupling mechanism for coupling the valve stem of the valve and the driving shaft of the actuator included in the foregoing valve gear comprises an end portion of the valve stem having a beveled end surface formed by cutting the end portion along an oblique plane inclined at a predetermined angle to the axis of the valve stem, and an end portion of the driving shaft of the actuator having a beveled end surface complementary to the beveled end surface of the valve stem formed by cutting the end portion along an oblique plane inclined to the axis of the driving shaft at a predetermined angle.

The before described coupling mechanism may be altered in that the end portion of the valve stem may be cut in a stepped shape, and the end portion of the driving shaft may be cut in a stepped shape complementary to the stepped shape of the end portion of the valve stem.

Also the before described coupling mechanism may be altered in that the end portion of the valve stem (or the driving shaft) may be shaped in a coupling projection, and the end portion of the driving shaft (or the valve stem) may be shaped in a coupling recess complementary to the coupling projection.

Furthermore, the before described coupling mechanism may be altered in that an end portion of the valve stem may have a beveled end surface formed by cutting the end portion along an oblique plane inclined at a predetermined angle to the axis of the valve stem, an end portion of the driving shaft of the actuator may have a beveled end surface complementary to the beveled end surface of the valve stem formed by cutting the end portion along an oblique plane inclined to the axis of the driving shaft at a predetermined angle, a coupling projection may be formed in the beveled end surface of the valve stem (or the driving shaft), and a coupling recess complementary to the coupling projection of the valve stem (or the driving shaft) may be formed in the beveled end surface of the driving shaft (or the valve stem).

According to the coupling mechanism of the present invention for coupling together the valve stem 3 and the driving shaft 5 of the actuator 4, the coupling end portions 8, 9 formed in the respective end portions of the valve stem 3 and the driving shaft 5 are able to engage with each other only when the driving shaft 5 is at a specific angular position relative to the valve stem 3. That is to say, the valve stem 3 and the driving shaft 5 may be engaged with each other at one particular point in the rotating direction of the driving shaft 5, the valve stem 3 and the valve element 2. Accordingly, the adjustment (or the synchronization) of the rotating angle of the valve stem 3 with the rotating angle of the driving shaft 5, which is necessary to adjust the rotation the actuator 4 with the degree of opening and closing of the valve element 2, may be achieved quite easily. And the angular position of the valve stem 3 and that of the driving shaft 5 of the actuator 4 can easily be matched so that the opening and closing of the valve element 2 is proportional to the angular movement of the driving shaft 4.

In the valve gear according to the present invention, a connecting portion 7a is provided on either the valve 1 or the valve operating actuator 4, the sleeve 7 having a smooth inner surface is fixedly or rotatably fitted in the hole formed in the connecting portion 7a of the valve 1 or the connecting portion of the valve operating actuator 4 so as to receive the valve stem 3 and the driving shaft 5 slidably therein and slidably contacting the inner smooth surface of the sleeve 7 with outer surfaces of the valve stem 3 and the driving shaft 5. The valve stem 3 and the driving shaft 5, inserted into the sleeve 7 through respective opposite ends, are provided in their end portions with coupling portions 8, 9, respectively. Therefore, the operation of aligning the respective axes of the valve stem 3 and the driving shaft 5 may be omitted. When the valve gear is assembled, the valve stem 3 and the driving shaft 5 can easily and correctly be coupled together in a short time by a worker other than a skilled worker, and the valve gear can easily be disassembled for maintenance.

According to the present invention, since the sleeve 7 is fixed to or rotatably supported in the bore 6 of the connecting portion of the valve 1 or the actuator 4, and the valve stem 3 and driving shaft 5 are slidably inserted into the said sleeve 7 and engage each other at the respective coupling end portions 8, 9, it is not necessary to use any bracket, which is indispensable for the conventional valve gear for connecting valve stem 3 and driving shaft 5 and assembling conventional valve gear. The valve gear of the present invention can easily be assembled and disassembled, and costs for the procurement or the manufacture of the bracket are not necessary, which is economically advantageous.

According to the valve gear of the present invention, the coupling end portions 8, 9 formed in the respective end portions of the valve stem 3 and the driving shaft 5 are able to engage with each other only when the driving shaft 5 is at a specific angular position relative to the valve stem 3. That is to say, the valve stem 3 and the driving shaft 5 may be engaged with each other at one particular point in the rotating direction of the driving shaft 5, the valve stem 3 and the valve element 2. Accordingly the adjustment (or the synchronization) of the rotating angle of the valve stem 3 with the rotating angle of the driving shaft 5, which is necessary to adjust the driving by the actuator 4 with the degree of opening and closing of the valve element 2, may be achieved quite easily.

Preferably, the sleeve employed in the present invention is formed of an abrasion-resistant resin, such as a fluororesin, to enable the sleeve to rotate or slide smoothly in the bore formed in the connecting portion of the valve, in the bore formed in the connecting portion of the actuator or the bore formed in the attachment.

If the respective diameters of the valve stem of the valve and the driving shaft of the actuator are different from each other, a sleeve having stepped inner circumference having a section of a diameter corresponding to that of the valve stem and another section of a diameter corresponding to that of the driving shaft may be employed, and the respective axes of the valve stem and the driving shaft are aligned necessarily with each other when the coupling end portions of the valve stem and the driving shaft having different diameters are fitted in the corresponding sections of the stepped inner circumference of the sleeve.

BRIEF DESCRIPTION OF THE DRAWINGS

The above and other objects, features and advantages of the present invention will become more apparent from the following description taken in connection with the accompanying drawings, in which:

FIG. 10 is a perspective view of a coupling member of the coupling mechanism of FIG. 9;

FIG. 11 is a plan view of the coupling member of the coupling mechanism of FIG. 9;

DETAILED DESCRIPTION OF THE PREFERRED EMBODIMENTS

Figure 1:
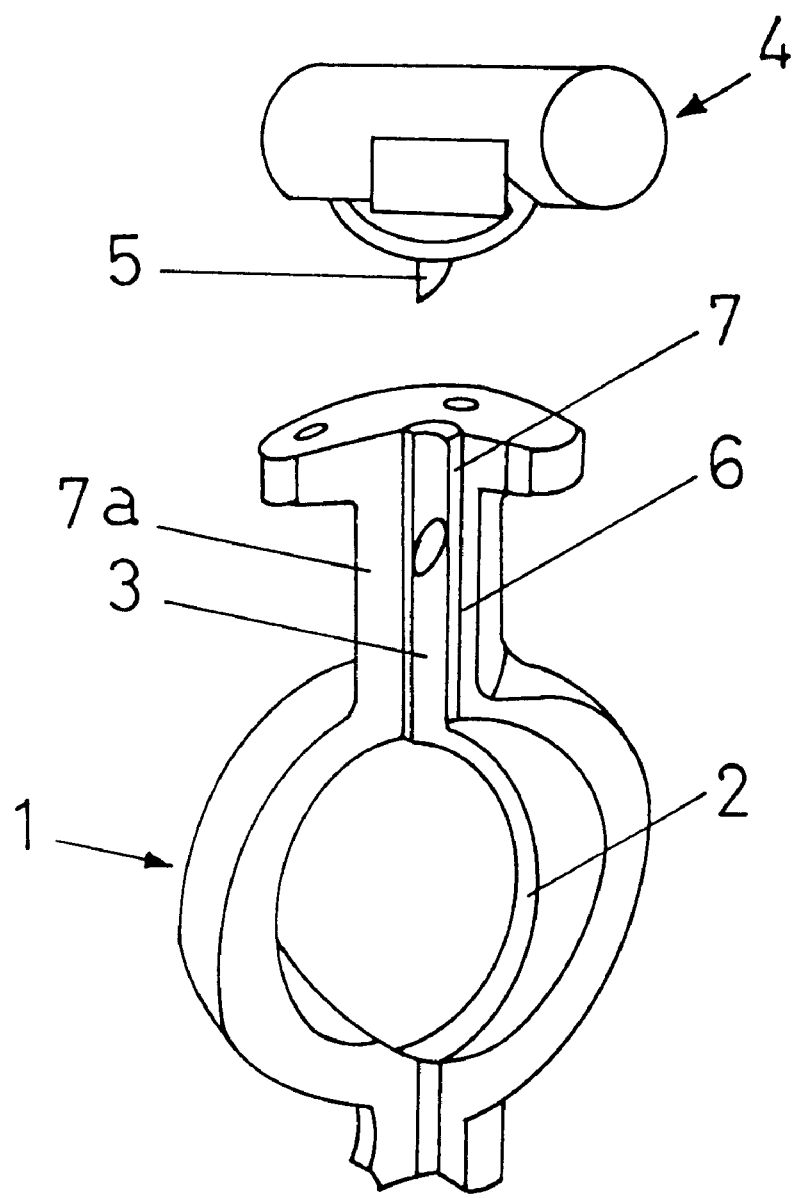
FIG. 1 is a partly broken, exploded perspective view of a valve gear in a first embodiment according to present invention.

FIG. 1 shows a valve gear in a preferred embodiment according to the present invention comprising a butterfly valve (hereinafter referred to simply as "valve") 1, an actuator 4, and a coupling mechanism for coupling together the valve stem 3 of the valve 1 and the driving shaft 5 of the actuator 4.

Referring to FIG. 1, the valve 1 has a connecting portion 7a provided with a bore 6. A sleeve 7 having smooth inner surface and made of a fluororesin is fixedly fitted in the bore 6.

In this embodiment, a connecting portion 7a having a bore 6 for receiving a sleeve 7 is provided only on the valve 1. It may be modified that a connecting portion 7a having a bore 6 for receiving a sleeve 7 is provided only on the actuator 4, also connecting portions 7a, 7a may be provided both on the valve 1 and the actuator 4.

Figure 2:
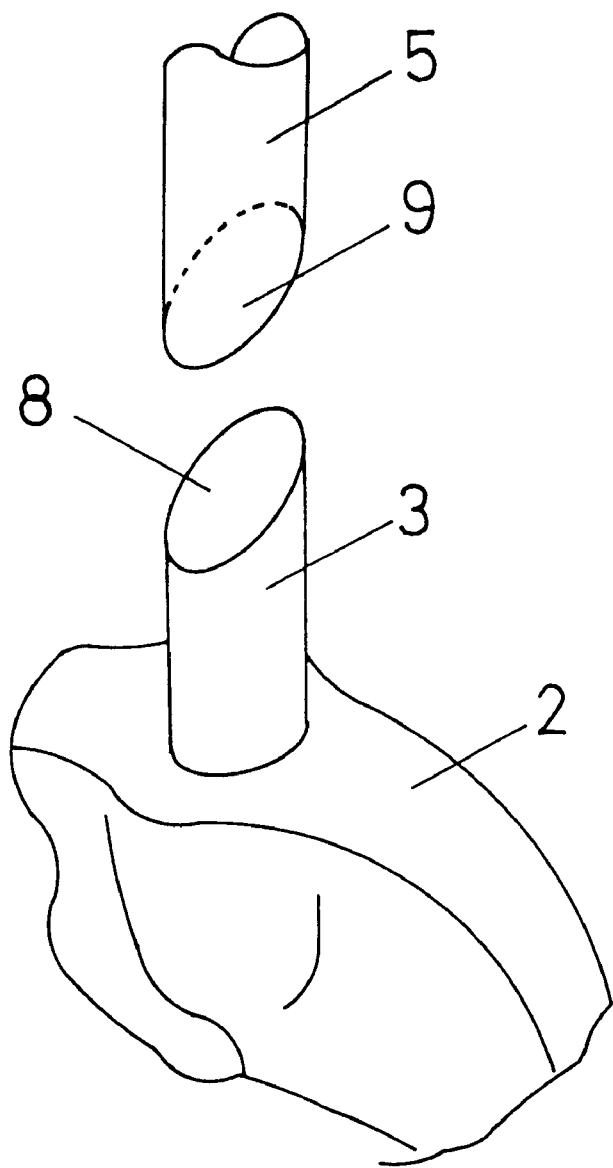
FIG. 2 is a fragmentary perspective view of a coupling mechanism for coupling together the valve stem of a valve and the driving shaft of an actuator included in the valve gear of FIG. 1.

Coupling end portions 8 and 9 are formed at the end portions of the valve stem 3 and the driving shaft 5, respectively, as shown in FIG. 2.

The end portions of the valve stem 3 and the driving shaft 5 are inserted into the sleeve 7 through the opposite ends of the sleeve 7 so that the coupling end portions 8 and 9 thereof engage with other. The respective axes of the valve stem 3 and the driving shaft 5 can easily be aligned with each other by simply inserting the valve stem 3 and the driving shaft 5 into the sleeve 7, since the valve stem 3 and the driving shaft 5 have the each respective coupling end portions 8 and 9.

In this embodiment, the inner surface of the sleeve 7 is a smooth surface and the outer surfaces of stem 3 and shaft 5 slidably contact with the inner surface of sleeve 7 so that the valve stem 3 and the driving shaft 5 are able to rotate or slide smoothly in the sleeve 7. Since the end portions of the valve stem 3 and the driving shaft 5 inserted in the sleeve 7 are provided with the coupling end portions 8 and 9, respectively, the respective axes of the valve stem 3 and the driving shaft 5 can easily be aligned with each other simply by inserting the respective end portions of the valve stem 3 and the driving shaft 5 in the sleeve 7 and engaging the coupling end portions 8 and 9.

According to the valve gear of the present embodiment, the coupling end portions 8 and 9 are provided with complementary beveled end surfaces inclined in opposite directions at the same predetermined angle to the respective axis of the valve stem 3 and the driving shaft 5 as shown in FIGS. 1 and 2.

This the coupling end portions 8, 9 formed in the respective end portions of the valve stem 3 and the driving shaft 5 are able to engage with each other only when the driving shaft 5 is at a specific angular position relative to the valve stem 3. That is to say, the valve stem 3 and the driving shaft 5 may be engaged with each other at one particular point of the rotating direction of the driving shaft 5, the valve stem 3 and the valve element 2. Accordingly the adjustment (or the synchronization) of the rotating angle of the valve stem 3 with the rotating angle of the driving shaft 5, which is required to adjust the driving by the actuator 4 with the degree of opening and closing of the valve element 2, may be achieved quite easily by inserting the valve stem 3 and the driving shaft 5 into the sleeve 7 through the respective opposite ends of the sleeve 7 and engaging the coupling end portions of 8 and 9.

Accordingly, the angular position of the valve stem 3 of the valve 1 and that of the driving shaft 5 of the actuator 4 can easily be matched so that the opening and closing of the valve element 2 is proportional to the angular movement of the driving shaft 5.

Various modifications of the foregoing coupling mechanism including other coupling end portions 8 and 9 are possible as follows.

Figure 3:
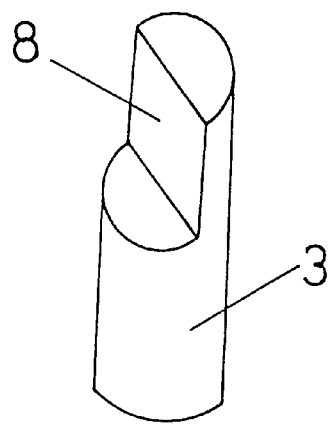
FIG. 3 is a perspective view of a coupling end portion of a valve stem (or a driving shaft) included in another possible coupling mechanism.
Figure 4:
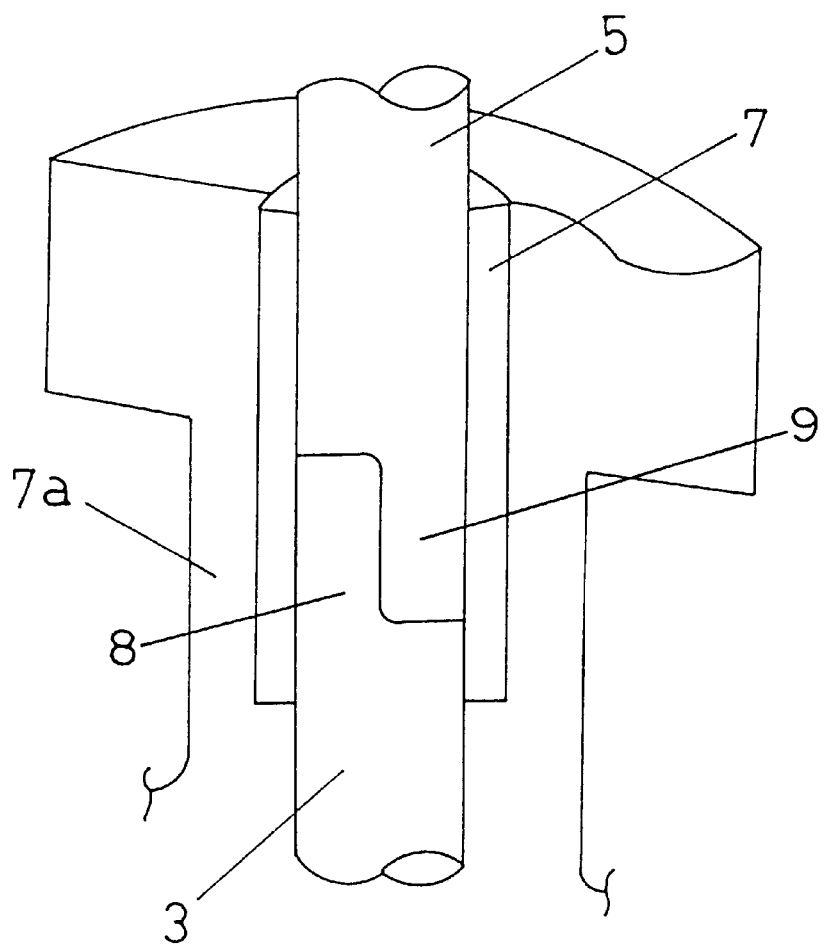
FIG. 4 is a longitudinal sectional perspective view of the coupling end portions of the valve stem and the driving shaft coupled together included in the coupling mechanism of FIG. 3.

Referring to FIGS. 3 and 4, a coupling mechanism includes coupling end portions 8 and 9 formed in the end portions of the valve stem 3 and the driving shaft 5, respectively. The coupling end portions 8 and 9 are formed by cutting portions of the respective end portions of the valve stem 3 and the driving shaft 5 in stepped shape so that the coupling end portions 8 and 9 of the valve stem 3 and the driving shaft 5 are able to engage with each other only when the driving shaft 5 is at a specific angular position relative to the valve stem 3. That is to say, the valve stem 3 and the driving shaft 5 may be engaged with each other at one particular point of the rotating direction of the driving shaft 5, the valve stem 3 and the valve element 2. FIG. 4 shows the coupling end portions 8 and 9 of the valve stem 3 and the driving shaft 5 as it would be when inserted in the sleeve 7 fitted in the connecting portion 7a of the valve 1 through the opposite ends of sleeve 7.

Figure 5:
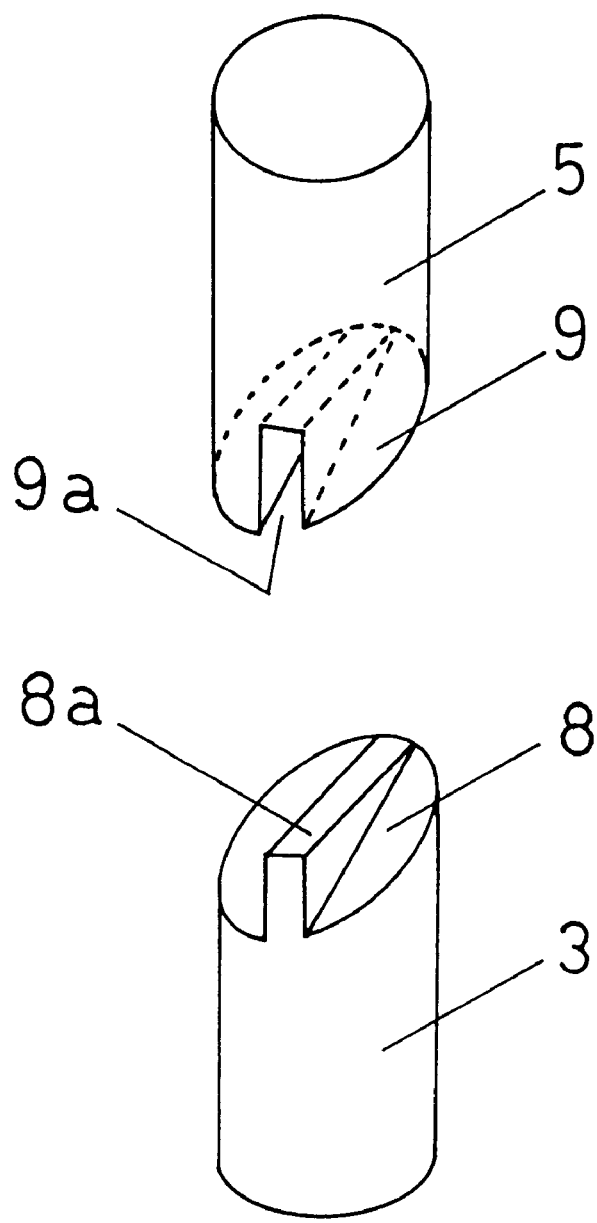
FIG. 5 is a perspective view of the coupling end portions of a valve stem and a driving shaft included in a third possible coupling mechanism.

FIG. 5 shows an improved modification of the coupling end portions 8 and 9 of the coupling mechanism shown in FIGS. 1 and 2. The end portion 8 of the valve stem 3 has a beveled end surface formed by cutting the end portion along an oblique plane inclined at a predetermined angle to the axis of the valve stem 3, the end portion of the driving shaft 5 of the actuator 4 has a beveled end surface complementary to the beveled end surface of the valve stem 3 formed by cutting the end portion along an oblique plane inclined to the axis of the driving shaft 5 at a predetermined angle, a coupling projection 8a is formed in the beveled end surface 8 of the valve stem 3, and a coupling recess 9a complementary to the coupling projection 8a of the valve stem 3 is formed in the beveled end surface 9 of the driving shaft 5.

As the before described, in the present invention, the sleeve 7 can fixedly be fitted in bore 6 formed in the connecting portion of the valve 1 or the actuator 4 without using any bracket, which is indispensable to the conventional valve gear.

Figure 6:
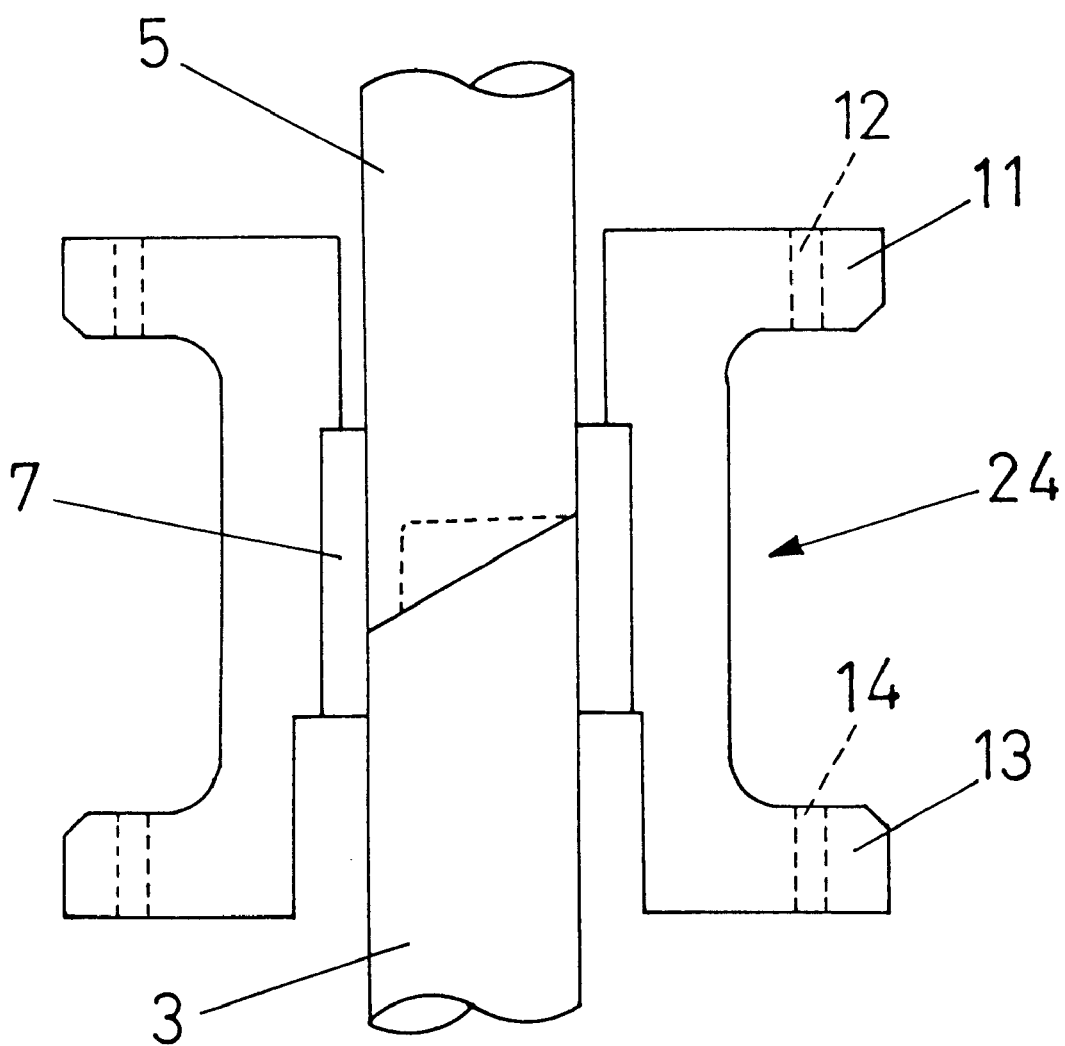
FIG. 6 is a longitudinal sectional view of a coupling mechanism coupling together the valve stem of a valve and the driving shaft of an actuator using an attachment.

Although the valve gear of the present invention does not need any bracket as before described, the sleeve 7, as shown in FIG. 6, may be fixedly fitted in a bore formed in an attachment 24, which is interposed between the valve 1 and the actuator 4. As shown in FIG. 6, the attachment 24 has one end provided with a flange 11 to be fastened to the actuator 4 with bolts screwed through holes 12 formed therein into the actuator 4, and the other end provided with a flange 13 to be fastened to the valve 1 with bolts screwed through holes 14 formed therein into the valve 1, and the sleeve 7 is fixedly fitted in a bore formed in the attachment 24, and the end portions of the valve stem 3 and the driving shaft 5 having the coupling end portions 8 and 9 shown in FIG. 5 are fitted in the sleeve 7.

Figure 7:
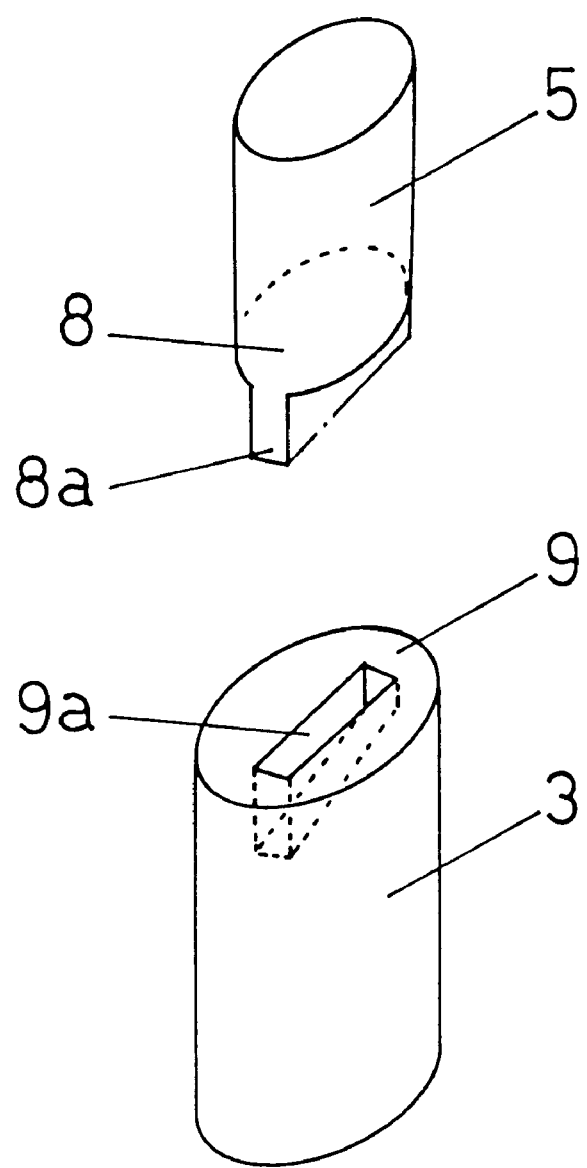
FIG. 7 is a perspective view of the coupling end portions of a valve stem and a driving shaft having a diameter different from that of the valve stem included in a fourth possible coupling mechanism.

FIG. 7 shows a coupling mechanism for coupling together a valve stem 3 and a driving shaft 5 having a diameter smaller than that of the valve stem 3. The coupling end portion 8 of the driving shaft 5 has a beveled end surface provided with a protrusion 8a, and the coupling end portion 9 of the valve stem 3 has a beveled end surface provided with a groove 9a complementary to the protrusion 8a. The positions of protrusion 8a and groove 9a are determined according to the respective axes of the driving shaft 5 and the valve stem 3. When the protrusion 8a of the driving shaft 5 is fitted in the groove 9a of the valve stem 3, the respective axes of the valve stem 3 and the driving shaft 5 are aligned with each other.

Figure 8:
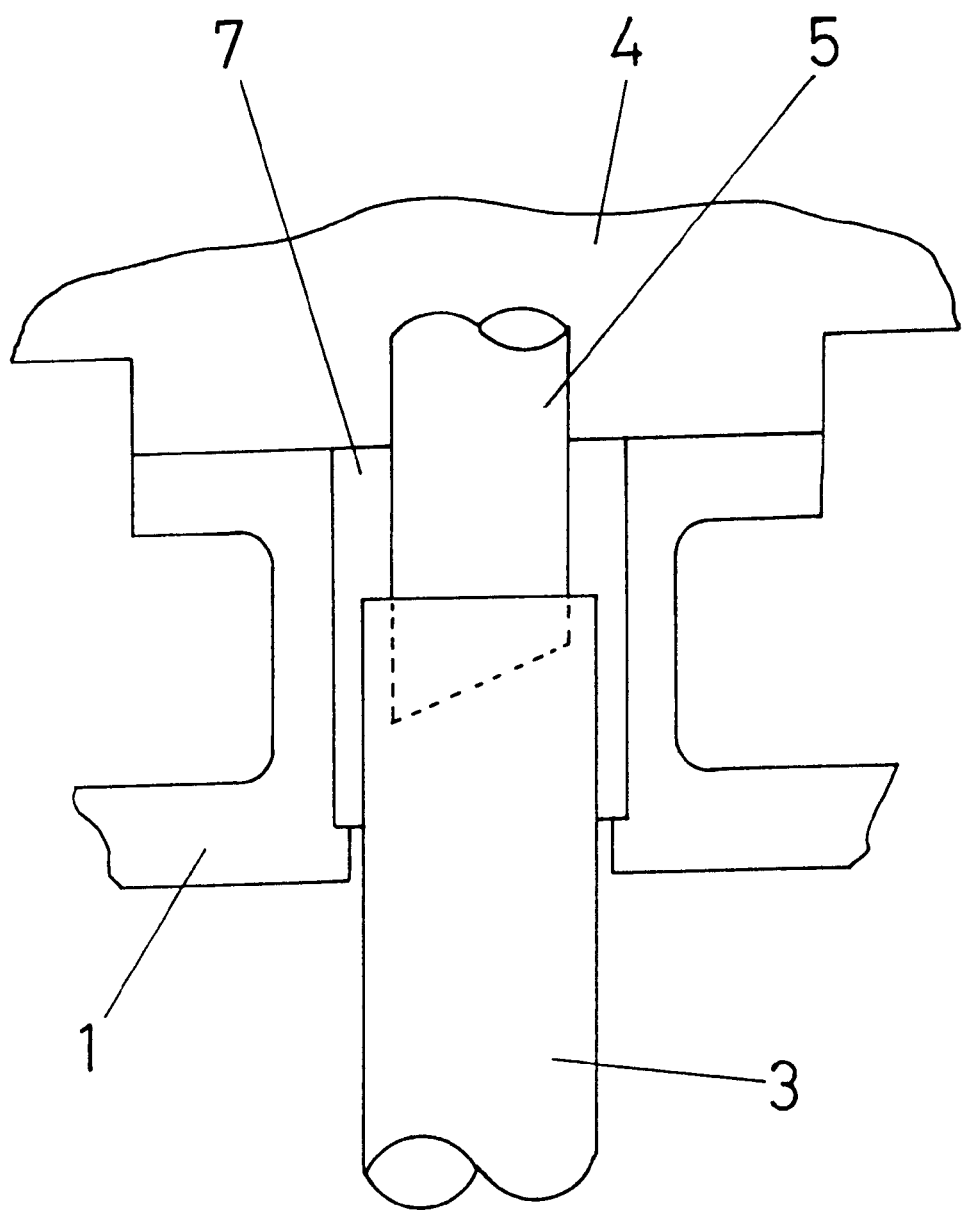
FIG. 8 is a longitudinal sectional view of the coupling mechanism of FIG. 7.

FIG. 8 shows the coupling mechanism in accordance with the present invention for coupling together the valve stem 3 and the driving shaft 5 having the diameter smaller than that of the valve stem 3 as shown in FIG. 7. A sleeve 7 fixedly fitted in a bore formed in the connecting portion of the valve 1 has a stepped bore consisting of a large section of a diameter corresponding to that of the valve stem 3, and a small section of a diameter corresponding to that of the driving shaft 5. This coupling mechanism also enables the respective axes of the valve stem 3 and the driving shaft 5 to be aligned easily with each other.

In the foregoing embodiments, the sleeve 7 is fixedly fitted in the bore of the connecting portion 7a of the valve 1 or the bore of the connecting portion of the actuator 4, the sleeve 7 may be loosely fitted in the bore for rotation. In this case, the sleeve 7 can loosely be fitted in the bore of the connecting portion of the valve 1 or the actuator 4 without using any bracket, which is indispensable to the conventional valve gear, as same as that the sleeve 7 is fixedly fitted in the bore.

Also, in this case, the sleeve may be rotatably supported in a bore formed in an attachment 24 disposed between the valve 1 and the actuator 4.

If the sleeve 7 is rotatably supported in the bore of the connecting portion 7a of the valve or the connecting portion of the actuator 4, the sleeve 7 may be rotated together with the valve stem 3 of the valve 1 and/or the driving shaft 5 of the actuator 4.

FIGS. 9 to 14 show coupling mechanisms each provided with connecting means 15 for connecting a sleeve 7 to a valve stem 3 and a driving shaft 5 to rotate the sleeve 7 together with the valve stem 3 and the driving shaft 5.

Figure 9:
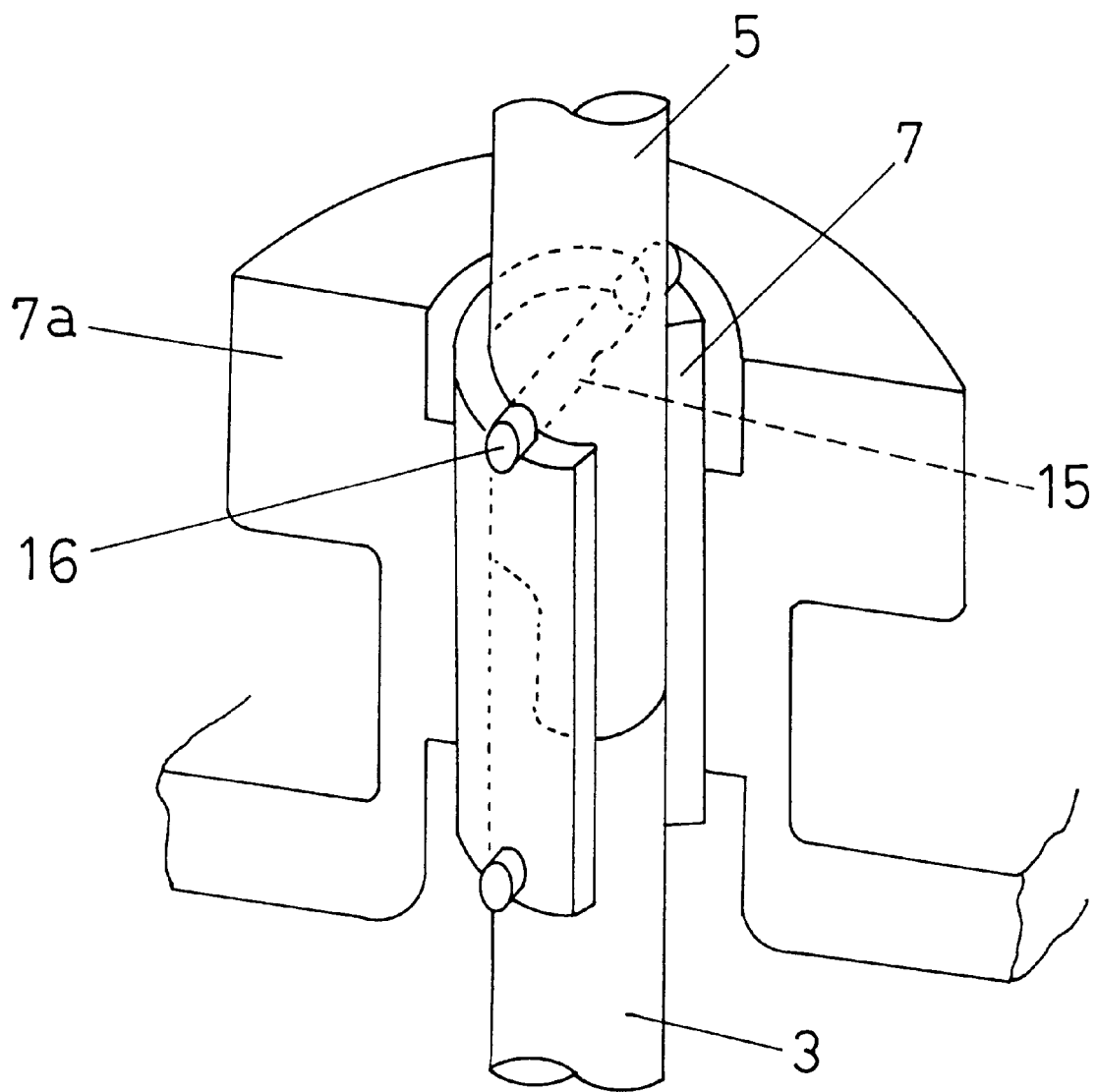
FIG. 9 is a longitudinal sectional perspective view of a coupling mechanism in which a sleeve is rotated together with the valve stem of a valve and/or the driving shaft of an actuator.

The connecting means 15 of the coupling mechanism, shown in FIGS. 9, 10 and 11, has pins 16 fixedly extended across the valve stem 3 and the driving shaft 5 so that the opposite ends of the pins 16 project from the valve stem 3 and the driving shaft 5, and recesses 17 formed in the upper and lower ends of the sleeve 7 so as to receive therein the opposite ends of the respective pin 16.

Figure 12:
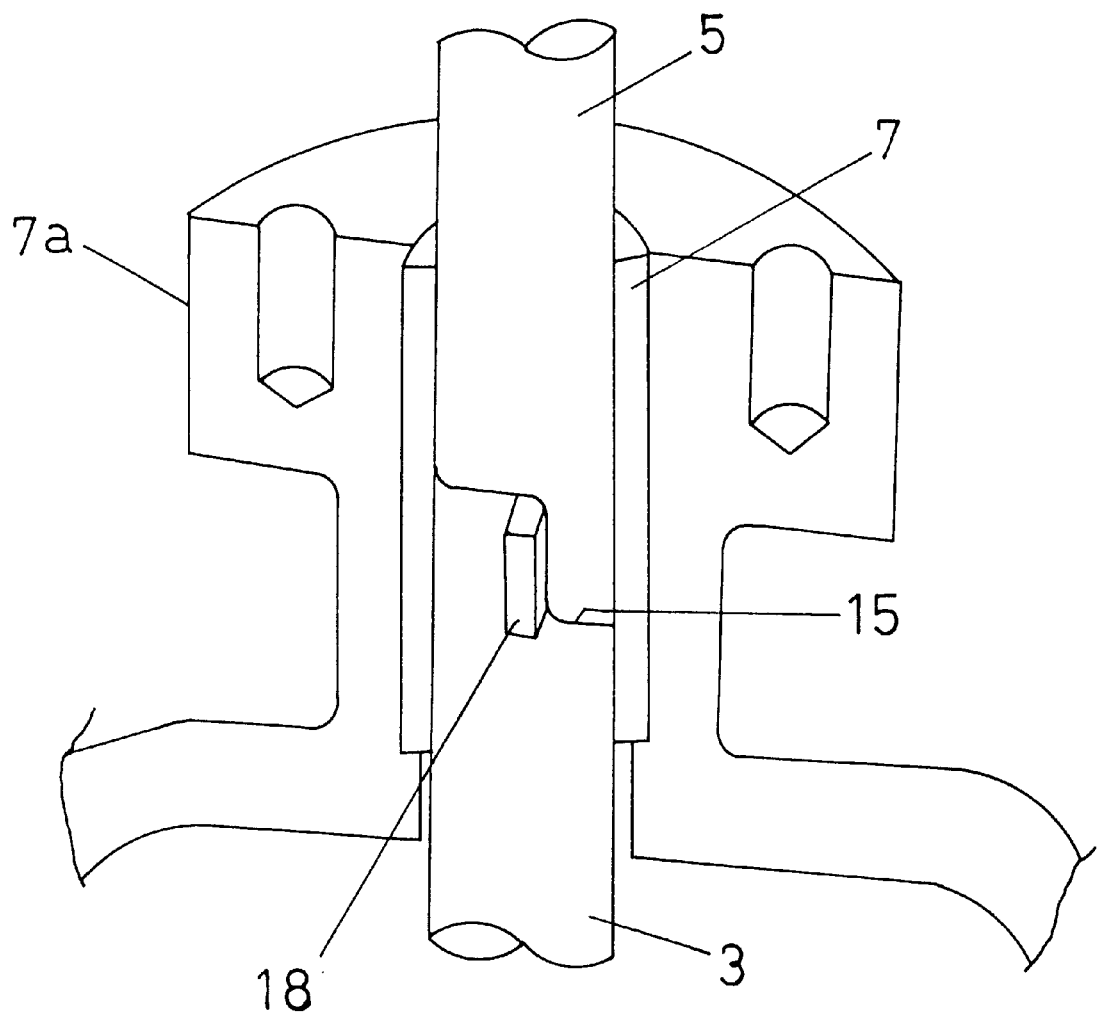
FIG. 12 is a longitudinal sectional perspective view of the another coupling mechanism in which a sleeve is rotated together with the valve stem of a valve and/or the driving shaft of an actuator.
Figure 13:
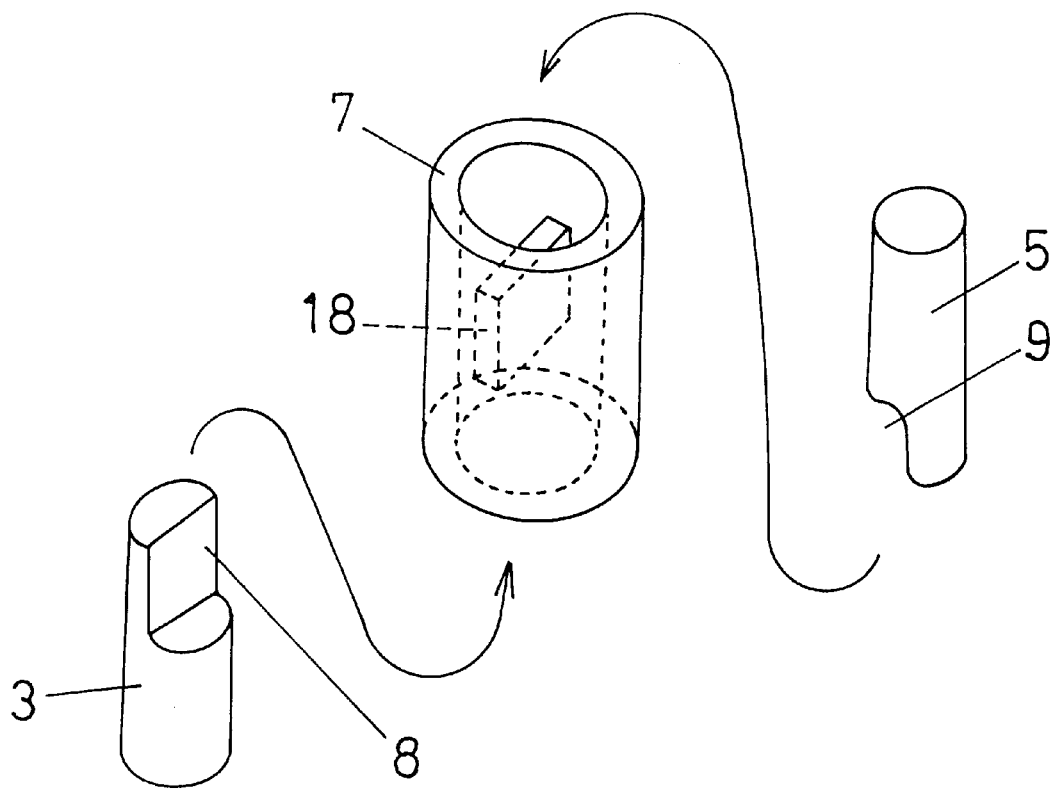
FIG. 13 is an exploded perspective view of a coupling member of the coupling mechanism of FIG. 12.

In the coupling mechanism shown in FIGS. 12 and 13, a plate 18 is disposed across the bore of a sleeve 7 in a longitudinal plane including the axis of the sleeve 7, and tongues 8 and 9 are formed in the end portions of a valve stem 3 and a driving shaft 5, respectively, so as to define a space complementary to the plate 18 so that the plate 18 is held between the tongues 8 and 9 when the valve stem 3 and the driving shaft 5 are joined together. It may be modified that the valve stem 3 and the driving shaft 5 may be provided with grooves 19 in their end surfaces as shown in FIG. 14 to receive the upper and the lower sides of the plate 18 in the grooves 19 when the valve stem 3 and the driving shaft 5 are aligned with each other and disposed in a predetermined angular relation.

Figure 14:
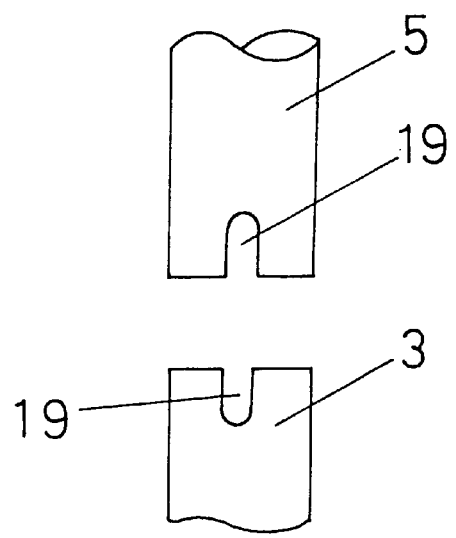
FIG. 14 is a side view of a modification of a coupling member of the coupling mechanism of FIG. 12.
Figure 15:
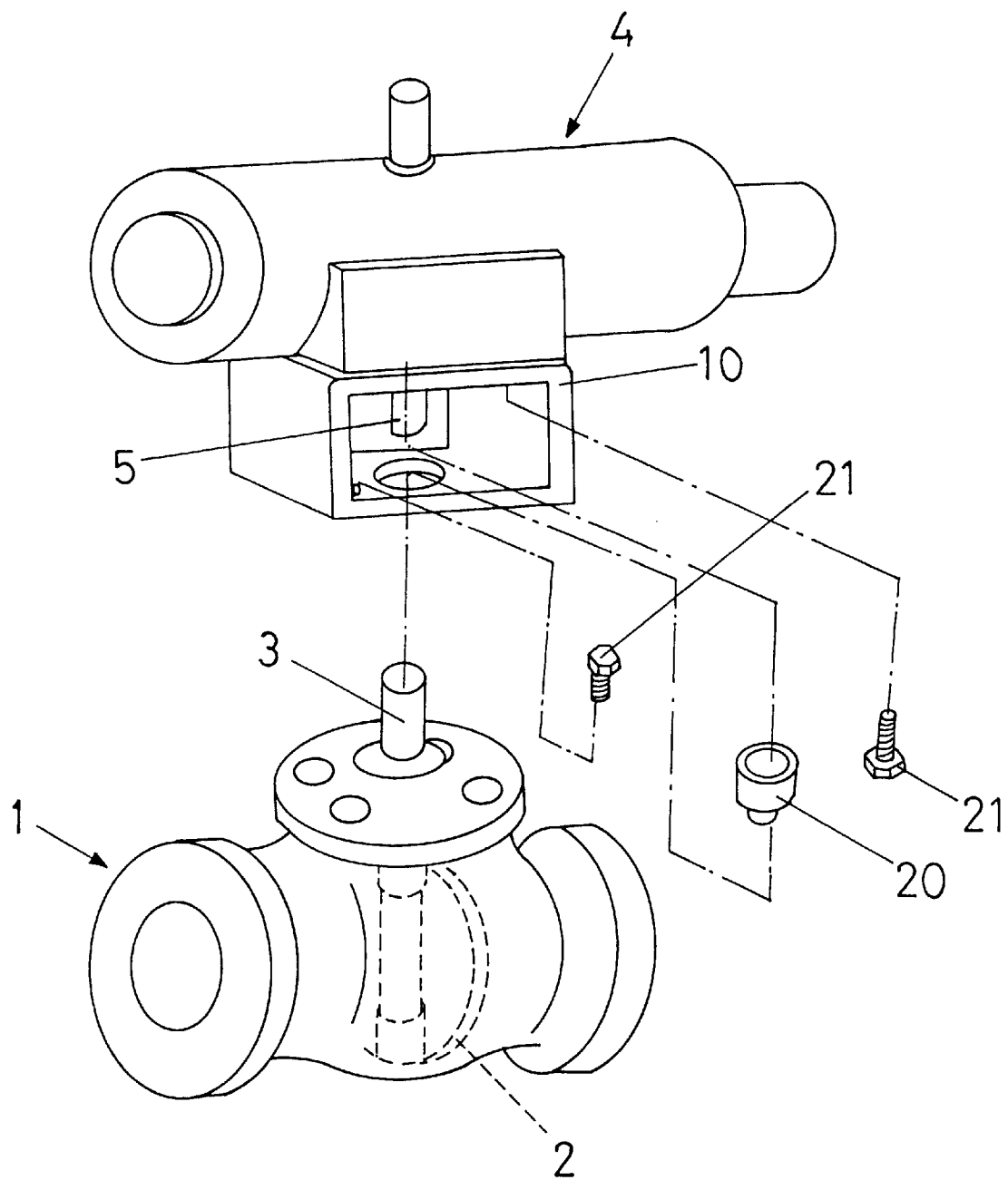
FIG. 15 is an exploded perspective view of a conventional valve gear having a valve and an actuator connected to the former.
Figure 16:
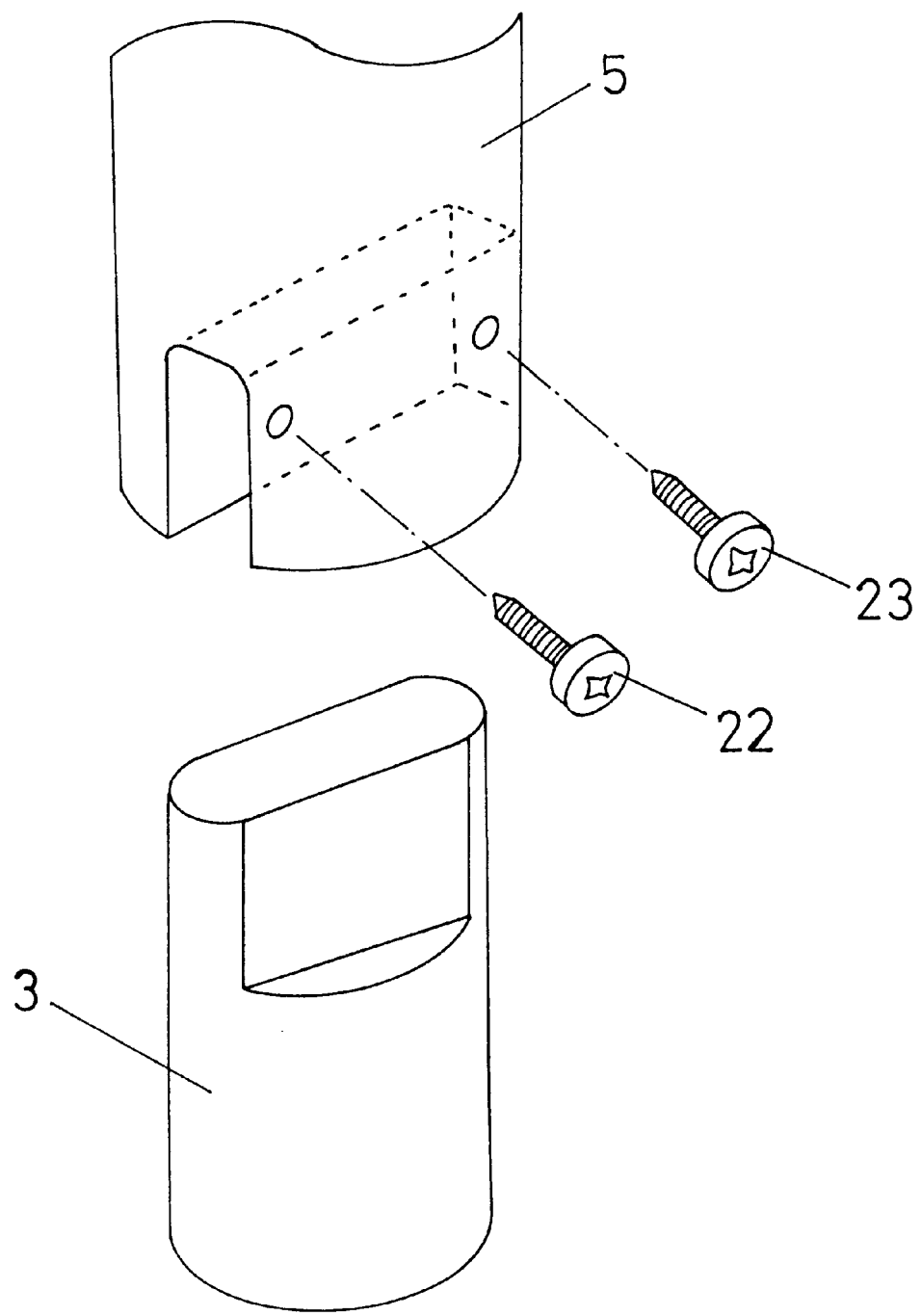
FIG. 16 is an exploded perspective view of a coupling mechanism for coupling the valve stem of the valve and the driving shaft of the actuator of the valve gear of FIG. 15.
Figure 17:
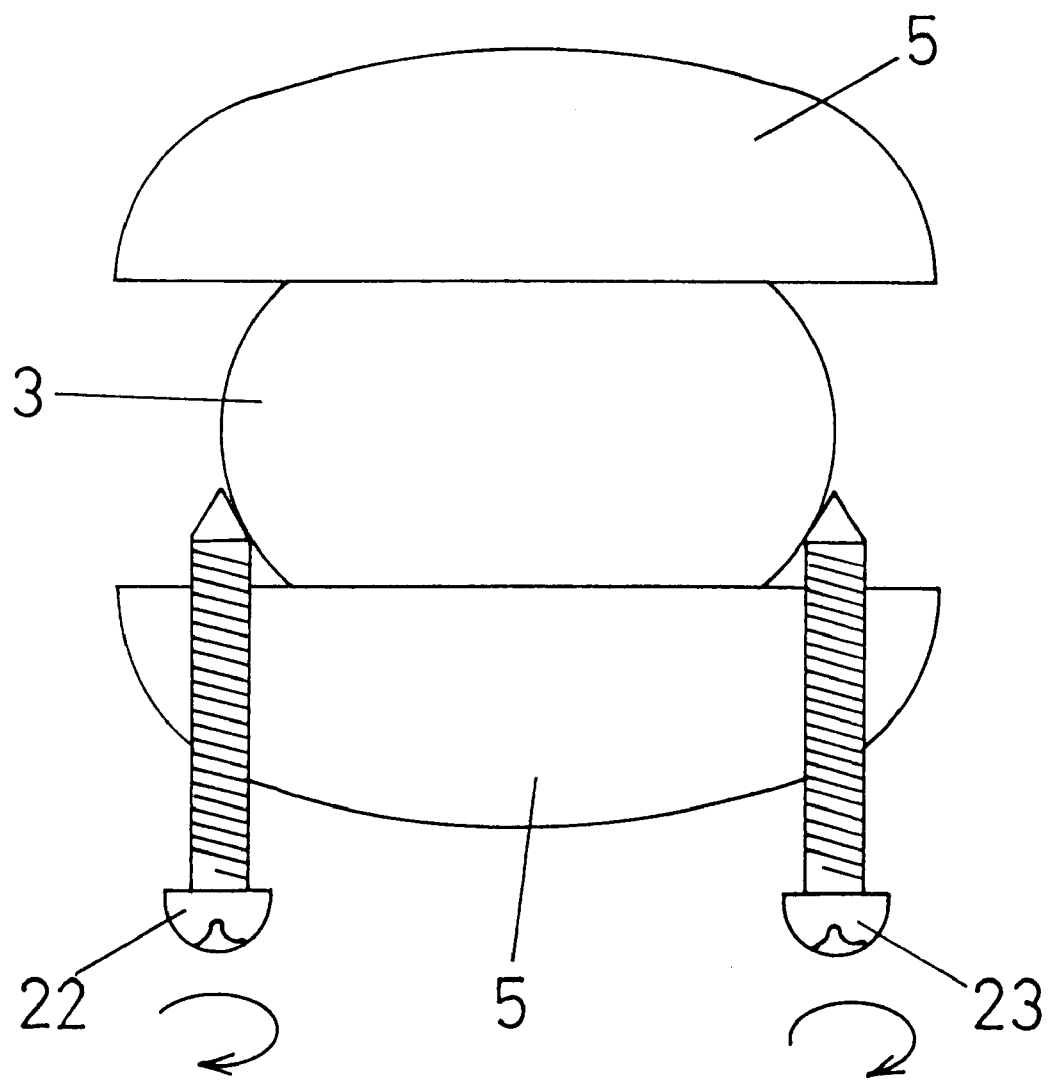
FIG. 17 is a cross sectional view of assistance in explaining a manner of aligning the respective axes of the valve stem of the valve and the driving shaft of the actuator of the valve gear of FIG. 15.

Both the coupling mechanism shown in FIGS. 9, 10 and 11 and the coupling mechanism shown in FIGS. 12 to 14 are capable of rotating the sleeve 7, which is rotatably supported in the bore, together with the valve stem 3 and the driving shaft 5.

Although the invention has been described in its preferred form with a certain degree of particularity, obviously many changes and variations are possible there to. It is therefore to be understood that the present invention may be practiced otherwise than as specifically described herein without departing from the scope and spirit thereof.

What is claimed is:

1. A valve gear comprising:

a valve having a valve element and a valve stem;

an actuator joined to said valve and having a driving shaft for operating said valve element of said valve;

one of said valve and said actuator having a connecting portion;

an attachment fixed to said connecting portion;

a sleeve fixedly fitted to said attachment, said sleeve having a smooth inner surface;

said valve stem and said driving shaft extending into opposite ends of said sleeve and having outer surfaces slidably contacting said smooth inner surface of said sleeve; and end portions of said valve stem and said driving shaft having respective coupling portions within said sleeve and engageable with each other to couple said valve stem to said driving shaft.

2. A valve gear as claimed in claim 1, wherein said coupling portions are engageable with each other at one position only in a direction of rotation of said valve stem and said driving shaft.

3. A valve gear as claimed in claim 1, wherein said sleeve is made of an abrasion resistant resin.

4. A valve gear as claimed in claim 1, wherein said coupling portions comprise a beveled end surface of said valve stem and a beveled end surface of said driving shaft, said beveled end surface of said valve stem being formed by cutting said end portion of said valve stem along an oblique plane inclined at a predetermined angle to the axis of said valve stem, said beveled end surface of said driving shaft being formed by cutting said end portion of said driving shaft along an oblique plane inclined at a predetermined angle to the axis of said driving shaft, and said beveled end surface of said valve stem and said beveled end surface of said driving shaft being complementary.

5. A valve gear as claimed in claim 1, wherein said coupling portions comprise respective stepped portions formed at said end portions of said valve stem and said driving shaft, said stepped portion of said valve stem being complementary to said stepped portion of said driving shaft.

6. A valve gear as claimed in claim 1, wherein said coupling portions comprise a coupling projection on said end portion of one of said valve stem and said driving shaft, and a coupling recess in said end portion of the other of said driving shaft and said valve stem, said coupling recess being complementary to said coupling projection.

7. A valve gear as claimed in claim 1, wherein said coupling portions comprise a beveled end surface of said valve stem and a beveled end surface of said driving shaft, said beveled end surface of said valve stem being formed by cutting said end portion of said valve stem along an oblique plane inclined at a predetermined angle to the axis of said valve stem, said beveled end surface of said driving shaft being formed by cutting said end portion of said driving shaft along an oblique plane inclined at a predetermined angle to the axis of said driving shaft, said beveled end surface of said valve stem and said beveled end surface of said driving shaft being complementary, a coupling projection on said beveled end surface of one of said valve stem and said driving shaft, and a coupling recess in said beveled end surface of the other of said driving shaft and said valve stem, said coupling recess being complementary to said coupling projection.

8. A valve gear comprising:

a valve having a valve element and a valve stem;

an actuator joined to said valve and having a driving shaft for operating said valve element of said valve;

one of said valve and said actuator having a connecting portion;

a sleeve fixedly fitted to said connecting portion, said sleeve having a smooth inner surface;

said valve stem and said driving shaft extending into opposite ends of said sleeve and having outer surfaces slidably contacting said smooth inner surface of said sleeve; and end portions of said valve stem and said driving shaft having respective coupling portions within said sleeve and engageable with each other to couple said valve stem to said driving shaft, said coupling portions comprising a beveled end surface of said valve stem and a beveled end surface of said driving shaft, said beveled end surface of said valve stem being formed by cutting said end portion of said valve stem along an oblique plane inclined at a predetermined angle to the axis of said valve stem, said beveled end surface of said driving shaft being formed by cutting said end portion of said driving shaft along an oblique plane inclined at a predetermined angle to the axis of said driving shaft, and said beveled end surface of said valve stem and said beveled end surface of said driving shaft being complementary.

9. A valve gear as claimed in claim 8, wherein said coupling portions are engageable with each other at one position only in a direction of rotation of said valve stem and said driving shaft.

10. A valve gear as claimed in claim 8, wherein said sleeve is made of an abrasion resistant resin.

11. A valve gear as claimed in claim 8, wherein said coupling portions further comprise a coupling projection on said beveled end surface of one of said valve stem and said driving shaft, and a coupling recess in said beveled end surface of the other of said driving shaft and said valve stem, said coupling recess being complementary to said coupling projection.

12. A valve gear comprising:

a valve having a valve element and a valve stem;

an actuator joined to said valve and having a driving shaft for operating said valve element of said valve;

one of said valve and said actuator having a connecting portion;

an attachment fixed to said connecting portion;

a sleeve rotatably fitted to said attachment, said sleeve having a smooth inner surface;

said valve stem and said driving shaft extending into opposite ends of said sleeve and having outer surfaces slidably contacting said smooth inner surface of said sleeve; and end portions of said valve stem and said driving shaft having respective coupling portions within said sleeve and engageable with each other to couple said valve stem to said driving shaft.

13. A valve gear as claimed in claim 12, wherein said coupling portions are engageable with each other at one position only in a direction of rotation of said valve stem and said driving shaft.

14. A valve gear as claimed in claim 12, wherein said sleeve is made of an abrasion resistant resin.

15. A valve gear as claimed in claim 12, wherein said coupling portions comprise a beveled end surface of said valve stem and a beveled end surface of said driving shaft, said beveled end surface of said valve stem being formed by cutting said end portion of said valve stem along an oblique plane inclined at a predetermined angle to the axis of said valve stem, said beveled end surface of said driving shaft being formed by cutting said end portion of said driving shaft along an oblique plane inclined at a predetermined angle to the axis of said driving shaft, and said beveled end surface of said valve stem and said beveled end surface of said driving shaft being complementary.

16. A valve gear as claimed in claim 12, wherein said coupling portions comprise respective stepped portions formed at said end portions of said valve stem and said driving shaft, said stepped portion of said valve stem being complementary to said stepped portion of said driving shaft.

17. A valve gear as claimed in claim 12, wherein said coupling portions comprise a coupling projection on said end portion of one of said valve stem and said driving shaft, and a coupling recess in said end portion of the other of said driving shaft and said valve stem, said coupling recess being complementary to said coupling projection.

18. A valve gear as claimed in claim 12, wherein said coupling portions comprise a beveled end surface of said valve stem and a beveled end surface of said driving shaft, said beveled end surface of said valve stem being formed by cutting said end portion of said valve stem along an oblique plane inclined at a predetermined angle to the axis of said valve stem, said beveled end surface of said driving shaft being formed by cutting said end portion of said driving shaft along an oblique plane inclined at a predetermined angle to the axis of said driving shaft, said beveled end surface of said valve stem and said beveled end surface of said driving shaft being complementary, a coupling projection on said beveled end surface of one of said valve stem and said driving shaft, and a coupling recess in said beveled end surface of the other of said driving shaft and said valve stem, said coupling recess being complementary to said coupling projection.

19. A valve gear comprising:

a valve having a valve element and a valve stem;

an actuator joined to said valve and having a driving shaft for operating said valve element of said valve;

one of said valve and said actuator having a connecting portion;

a sleeve rotatably fitted to said connecting portion, said sleeve having a smooth inner surface;

said valve stem and said driving shaft extending into opposite ends of said sleeve and having outer surfaces slidably contacting said smooth inner surface of said sleeve; and end portions of said valve stem and said driving shaft having respective coupling portions within said sleeve and engageable with each other to couple said valve stem to said driving shaft, said coupling portions comprising a beveled end surface of said valve stem and a beveled end surface of said driving shaft, said beveled end surface of said valve stem being formed by cutting said end portion of said valve stem along an oblique plane inclined at a predetermined angle to the axis of said valve stem, said beveled end surface of said driving shaft being formed by cutting said end portion of said driving shaft along an oblique plane inclined at a predetermined angle to the axis of said driving shaft, and said beveled end surface of said valve stem and said beveled end surface of said driving shaft being complementary.

20. A valve gear as claimed in claim 19, wherein said coupling portions are engageable with each other at one position only in a direction of rotation of said valve stem and said driving shaft.

21. A valve gear as claimed in claim 19, wherein said sleeve is made of an abrasion resistant resin.

22. A valve gear as claimed in claim 19, wherein said coupling portions further comprise a coupling projection on said beveled end surface of one of said valve stem and said driving shaft, and a coupling recess in said beveled end surface of the other of said driving shaft and said valve stem, said coupling recess being complementary to said coupling projection.

* * * * *